(12) United States Patent
Zheng et al.

(10) Patent No.: US 11,108,250 B2
(45) Date of Patent: Aug. 31, 2021

(54) METHOD FOR COMBINED USE OF VARIOUS BATTERIES

(71) Applicant: HANGZHOU GOLD ELECTRONIC EQUIPMENT INC., LTD., Hangzhou (CN)

(72) Inventors: Yi Zheng, Hangzhou (CN); Hao Wang, Hangzhou (CN); Jianhong Xu, Hangzhou (CN)

(73) Assignee: HANGZHOU GOLD ELECTRONIC EQUIPMENT INC., LTD., Hangzhou (CN)

( * ) Notice: Subject to any disclaimer, the term of this patent is extended or adjusted under 35 U.S.C. 154(b) by 240 days.

(21) Appl. No.: 16/329,489

(22) PCT Filed: Aug. 30, 2017

(86) PCT No.: PCT/CN2017/099661
§ 371 (c)(1),
(2) Date: Feb. 28, 2019

(87) PCT Pub. No.: WO2018/041141
PCT Pub. Date: Mar. 8, 2018

(65) Prior Publication Data
US 2019/0190282 A1   Jun. 20, 2019

(30) Foreign Application Priority Data

Aug. 31, 2016 (CN) .......................... 201610793189.3

(51) Int. Cl.
*H02J 7/00* (2006.01)
*H01M 10/54* (2006.01)
*H01M 10/44* (2006.01)

(52) U.S. Cl.
CPC ............ *H02J 7/0021* (2013.01); *H01M 10/44* (2013.01); *H01M 10/54* (2013.01); *H02J 7/0024* (2013.01); *H02J 7/0026* (2013.01)

(58) Field of Classification Search
CPC ...... H02J 7/0021; H02J 7/0024; H02J 7/0026; H01M 10/44; H01M 10/54
USPC .......................... 320/116, 132, 134; 429/61
See application file for complete search history.

(56) References Cited

U.S. PATENT DOCUMENTS

| | | | | |
|---|---|---|---|---|
| 2011/0239445 A1* | 10/2011 | Ibi | ........................ | H01M 10/54 |
| | | | | 29/623.1 |
| 2015/0093611 A1* | 4/2015 | Obata | ............... | H01M 10/4207 |
| | | | | 429/61 |
| 2016/0240898 A1* | 8/2016 | Koba | .................... | H01M 10/54 |

* cited by examiner

*Primary Examiner* — Edward Tso
*Assistant Examiner* — Aaron Piggush
(74) *Attorney, Agent, or Firm* — Jiwen Chen; Jacobson Holman PLLC

(57) ABSTRACT

The invention relates to a method for combined use of various batteries, and belongs to the technical field of batteries. The method comprises the steps: setting a full-charge reference capacity of batteries; selecting the batteries meeting the capacity requirement selected from a battery set to form a new battery set, and then forming a set including various batteries; selecting battery modules to form a set; and adjusting the state of charge of the selected battery modules, and then connecting the battery modules in series for use. As a supplement to existing usage methods, the management method for combined use of various batteries can fulfill safe and reasonable series use of different types of batteries, and lithium ion batteries are used more effectively.

8 Claims, 2 Drawing Sheets

METHOD FOR COMBINED USE OF VARIOUS BATTERIES

BACKGROUND OF THE INVENTION

This is a U.S. national stage application of PCT Application No. PCT/CN2017/099661 under 35 U.S.C. 371, filed Aug. 30, 2018 in Chinese, claiming priority of Chinese Application No. 201610793189.3, filed Aug. 31, 2016, all of which are hereby incorporated by reference

1. Technical Field

The present invention belongs to the technical field of batteries, and relates to a system and method for hybrid management of various batteries, in particular to a management system and method for combined use of different types of lithium ion batteries.

2. Description of Related Art

With the emphasis by humans on the living environment, the understanding of the severe negative crises caused by modern civilization and the redefinition and re-recognition on future industrial civilization and material civilization of human society, humans have been deeply aware of two principles which must be followed for economic development: environmental protection and reasonable utilization of non-renewable resources. The rapid development of new energy technologies and energy storage technologies has led to wide application of batteries, such as various lithium ion batteries including lithium iron phosphate batteries, ternary lithium batteries and lithium titanate batteries, to electric automobiles, energy-storage power stations and backup power systems.

In the prior art, lithium ion batteries are used in the following way: first, when used for the first time, the same type of batteries produced by the same battery manufacturer are selected to form a battery pack; second, the multiple batteries in the battery pack are connected in series or in parallel for use; after being used for a period of time, the batteries are used in gradient or are discarded when the battery life fails to reach the corresponding standard; and when used in gradient, it is also necessary to select the same type of batteries produced by the same battery manufacturer to form a battery pack and then to connect the batteries in the battery pack in series or in parallel for use.

From the above description, it is the basic requirement to use the same type of batteries produced by the same battery manufacturer in combination; however, in the subsequent gradient utilization process, various lithium ion batteries cannot be used flexibly and rapidly due to the basic requirement.

BRIEF SUMMARY OF THE INVENTION

The objective of the invention is to solve the above-mentioned problems of the prior art by providing a management method and system for combined use of different types of lithium ion batteries.

To fulfill the above objective, the following technical solution is provided by the invention:

The invention relates to a method for combined use of various batteries. The method comprises the following steps:

(1) Providing various battery sets $N=\{N_1, N_2, \ldots, N_i\}$, wherein the $i^{th}$ lithium ion battery set $N_i$ includes $S_i$ battery modules, $i \geq 1$, and i is an integer;

(2) Setting a reference capacity C0;

(3) Selecting lithium ion battery modules having a capacity greater than or equal to (C0−ΔC) and smaller than or equal to (C0+ΔC) after being fully charged from the battery set $N_i$ to form a battery set $newN_k$, and then forming a set $newN=\{newN_1, newN_2, \ldots, newN_k\}$ including various batteries, wherein $0.001 \leq \Delta C/C0 \leq 0.1$, $1 \leq k \leq i$, and k is an integer;

(4) Selecting m battery modules from the battery set $newN_k$ according to requirements for battery modules to constitute a set $useN=\{useN_1, useN_2, \ldots, useN_o\}$ according to the types of the battery modules, wherein $1 \leq o \leq k$, o is an integer, the $o^{th}$ lithium ion battery set $useN_o$ includes $useS_o$ battery modules, and $m=\Sigma useS_o$; and (5) Adjusting the state of charge (SOC) of the selected battery modules to make the maximum SOC and the minimum SOC of the battery modules selected from the battery module set useN meet |MaxSOC−MinSOC|≤ΔS, and then connecting the selected battery modules in series to form a battery pack for use, wherein $0.001 \leq \Delta S \leq 0.1$.

The full-charge capacity in the invention refers to the battery capacity after the batteries are fully charged, and the unit of the full-charge capacity is Ah. The SOC refers to the ratio of the residual capacity to the full-charge capacity and is usually represented by percentage ($0 \leq SOC \leq 1$).

Preferably, when one or more battery modules in the battery module set useN need to be replaced due to damage or decrease of the full-charge capacity after the battery modules are used for a period of time, another battery module is selected from the battery module set useN, then the SOC of the selected battery module is adjusted to fall between MaxSOC and MinSOC of the battery module set useN measured after the to-be-replaced battery module is removed, and then the selected battery module is connected into the battery module set useN for use.

Preferably, the batteries are lithium ion batteries.

Preferably, the batteries are selected from two or more of lithium iron phosphate batteries, lithium titanate batteries, ternary lithium batteries, lithium manganate batteries and lithium cobalt oxide batteries.

Preferably, $\Delta C/C0=0.05$, and $\Delta S=0.05$.

Preferably, each battery module in the battery set useN is managed through a battery management module $M_j$, wherein $1 \leq j \leq m$, and j is an integer; and the whole series battery pack is managed through a battery pack management module, and the battery management module $M_j$ is electrically connected with the battery pack management module via a communication unit.

Preferably, the battery management module $M_j$ comprises an acquisition module, a balance module, a control module and a communication unit, and the acquisition module, the balance module and the communication unit are connected with the control module.

Preferably, the battery pack management module comprises a pack acquisition module, a general control module and a communication module, and the general control module is connected with the pack acquisition module, the communication module and the battery management modules.

Preferably, the communication unit is a CAN bus.

By adoption of this technical solution, the invention has the following beneficial effects over the prior art:

As a supplement to existing usage methods, the management method for combined use of various batteries can fulfill safe and reasonable series use of different types of batteries, and lithium ion batteries are used more effectively.

DETAILED DESCRIPTION OF THE INVENTION

For a better understanding of the invention, the invention is expounded below with reference to embodiments. The following embodiments are used to explain the invention, but are not intended to limit the scope of the invention.

Figure 1:
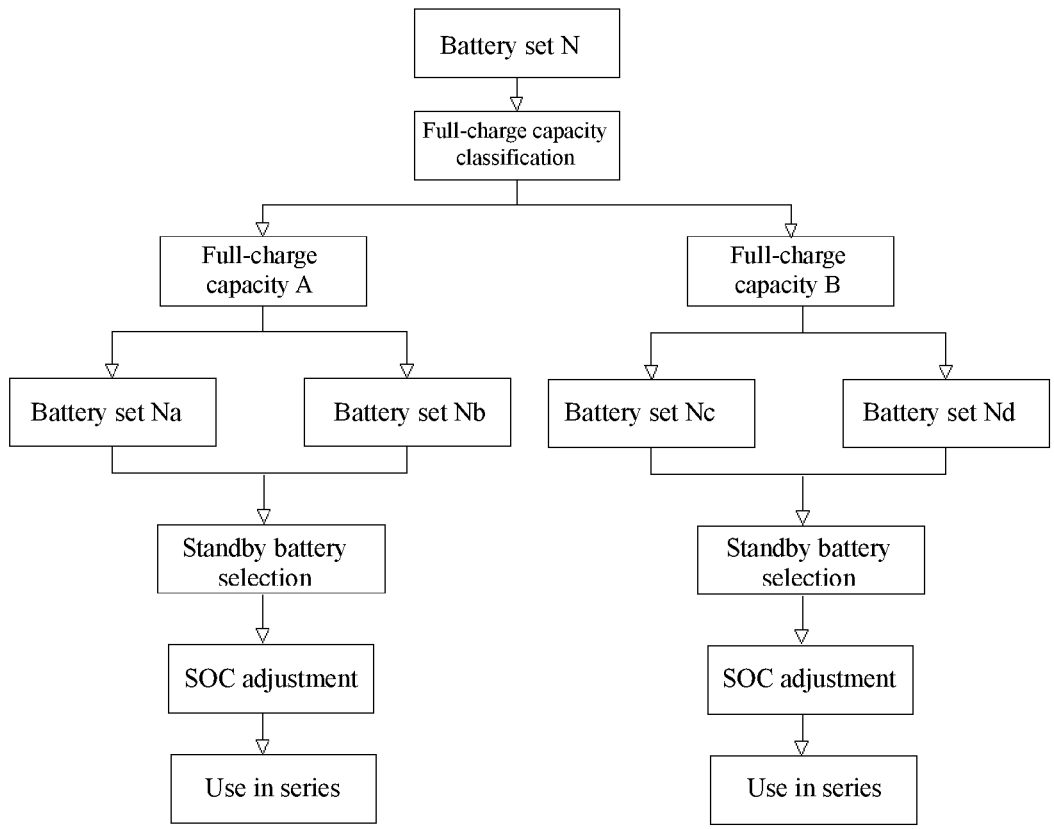
FIG. 1 is a flow diagram of a method for combined use of various batteries of the invention.

Referring to FIG. 1, a method for combined use of various batteries comprises the following steps:

(1) Various battery sets $N=\{N_1, N_2, \ldots, N_i\}$ are provided, wherein the $i^{th}$ lithium ion battery set $N_i$ includes $S_i$ battery modules, $i \geq 1$, and i is an integer;

(2) A reference capacity C0 is set;

(3) The lithium ion battery modules having a capacity greater than or equal to (C0−ΔC) and smaller than or equal to (C0+ΔC) after being fully charged are selected from the battery set $N_i$ to form a battery set $newN_k$, and a set $newN=\{newN_1, newN_2, \ldots, newN_k\}$ including various batteries is formed, wherein ΔC/C0=0.05, $newN=\{newN_1, newN_2, \ldots, newN_k\}$, $1 \leq k \leq i$, and k is an integer;

(4) m battery modules are selected from the battery set $newN_k$ according to requirements for the battery modules to constitute a set $useN=\{useN_1, useN_2, \ldots, useN_o\}$ according to the types of the battery modules, wherein $1 \leq o \leq k$, o is an integer, the $o^{th}$ lithium ion battery set $useN_o$ includes $useS_o$ battery modules, and $m=\Sigma useS_o$; and (5) The SOC of the selected battery modules is adjusted to make the maximum SOC and the minimum SOC of the battery modules selected from the battery module set useN meet |MaxSOC−MinSOC|≤ΔS, and then the selected battery modules are connected in series to form a battery pack for use, wherein ΔS=0.05.

Referring to FIG. 1, different series battery packs can be formed for use by classifying the battery sets N in terms of different reference battery capacities C0=A or B. For instance, three types of battery sets are provided, wherein a lithium iron phosphate battery set $N_1$ includes three battery modules, a lithium titanate battery set $N_2$ includes four battery modules, and a ternary lithium battery set $N_3$ includes five battery modules. A reference capacity C0 is set, the battery modules meeting |(C−C0)/C0|≤5% are selected from the twelve battery modules, so that a set $newN=\{newN_1, newN_2, newN_3\}$ is formed by a lithium iron phosphate battery set $newN_1$ including two battery modules, a lithium titanate battery $newN_2$ including three battery modules and a ternary lithium battery set $newN_3$ including four battery modules, meeting |(C−C0)/C0|≤5%.

Then, four standby battery modules are selected from the set newN according to circuit requirements (such as voltage, current or power requirements), wherein two lithium titanate batteries are selected from $newN_2$ and two ternary lithium batteries are selected from $newN_3$ to form a set $useN=\{useN_1, useN_2\}$. Finally, the SOC of the four battery modules in useN is adjusted to make the maximum SOC and the minimum SOC of the battery modules meet |MaxSOC−MinSOC|≤0.05, and then the four battery modules are connected in series to form a battery pack for use. Different series battery packs can be generated by adjusting the reference capacity C0.

Figure 2:
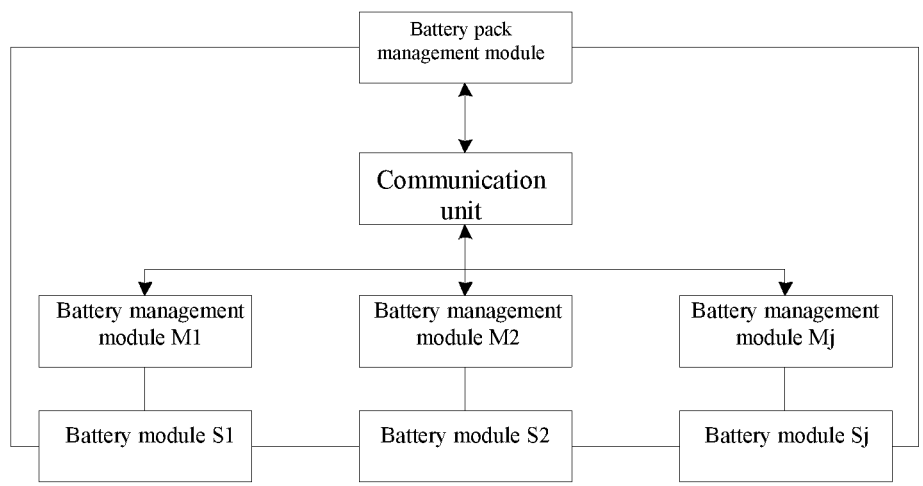
FIG. 2 is a functional block diagram of battery management modules and a battery pack management module of the invention.
Figure 3:
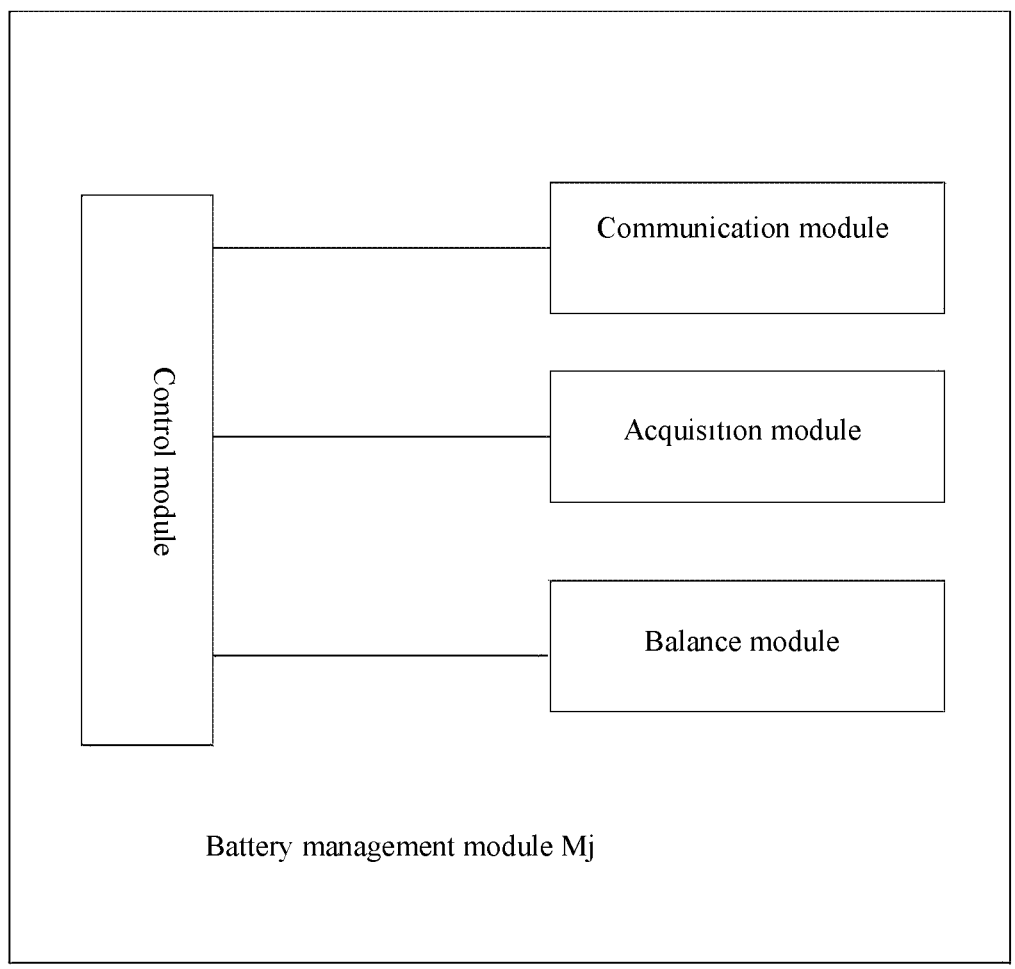
FIG. 3 is a functional block diagram of the battery management module of the invention.

Referring to FIGS. 2-3, each battery module in the battery set useN is managed through a battery management module $M_j$, wherein $1 \leq j \leq m$, and j is an integer. The whole series battery pack is managed through a battery pack management module, and the battery management module $M_j$ is electrically connected with the battery pack management module via a communication unit. Particularly, a battery module S1 is managed through a management module M1, a battery module S2 is managed through a management module M2, . . . . The communication unit is a CAN communication bus. The battery management module $M_j$ is connected with the battery pack management module via the CAN communication bus. The battery pack management module is connected with a series battery pack for combined use of various lithium ion batteries.

The battery management module $M_j$ comprises an acquisition module, a balance module, a control module and a communication unit, wherein the acquisition module, the balance module and the communication unit are connected with the control module; the acquisition module is used for acquiring voltage, current and temperature data of the corresponding battery module, the balance module is used for realizing balanced charging or discharging of the corresponding battery module, the communication unit is used for uploading acquired data and instructions to the battery pack management module and receiving data and instructions issued by the battery pack management module, and the control module is used for transmitting the instructions to the corresponding module.

The battery pack management module comprises a pack acquisition module, a general control module and a communication module, wherein the general control module is connected with the pack acquisition module, the communication module and the control modules of the battery management modules. The pack acquisition module is used for acquiring voltage, current and environment temperature data of the battery pack, the communication module is used for sending acquired data and instructions to the battery management modules, receiving data and instructions uploaded by the battery management modules, transmitting corresponding data and instructions to the outside and receiving data and instructions issued by the outside, and the control module is used for sending the instructions to the corresponding modules. The battery pack management module is used for unified computation of data uploaded by the battery management module $M_j$ and relevant data such as SOC data and SOH data, and the battery management module $M_j$ is controlled to realize balance control over the lithium ion batteries and to generate corresponding warning signals.

What should be noted is that each battery module is usually formed by one or more batteries.

When the voltage of a certain lithium titanate battery module $S_1$ in the battery set useN (or a certain battery in the lithium titanate battery module $S_1$) is greater than an overvoltage value such as 2.7V or is smaller than an undervoltage value such as 1.9V, the corresponding battery management module $M_1$ uploads a warning message. When the temperature of the battery module $S_1$ is greater than an over-temperature value such as 55☐, the corresponding battery management module $M_1$ also uploads a warning message. When the voltage a certain ternary lithium battery module $S_2$ (or a certain battery in the ternary lithium battery module $S_2$) is greater than an over-voltage value such as 4.2V or is smaller than an under-voltage value such as 2.5V, the corresponding battery management module $M_2$ uploads a warning message. When the temperature of the battery module $S_2$ is smaller than an under-temperature value such as 0☐, the corresponding battery management module $M_2$ also uploads a warning message. When the current of the series battery pack is greater than an over-current value such as three times of the rated capacity current, the battery pack management module outputs a warning message and then conducts control according to the corresponding warning message.

Embodiment 2

A method for combined used of various batteries comprises the following steps:
(1) Various battery sets $N=\{N_1, N_2, \ldots, N_i\}$ are provided, wherein the $i^{th}$ lithium ion battery set $N_i$ includes $S_i$ battery modules, i≥1, and i is an integer;
(2) A reference capacity C0 is set;
(3) The lithium ion battery modules having a capacity greater than or equal to (C0−ΔC) and smaller than or equal to (C0+ΔC) after being fully charged are selected from the battery set $N_i$ to form a battery set $newN_k$, and a set $newN=\{newN_1, newN_2, \ldots, newN_k\}$ including various batteries is formed, wherein ΔC/C0=0.05, $newN=\{newN_1, newN_2, \ldots, newN_k\}$, 1≤k≤i, and k is an integer;
(4) m battery modules are selected from the battery set $newN_k$ according to requirements for the battery modules to constitute a set $useN=\{useN_1, useN_2, \ldots, useN_o\}$ according to the types of the battery modules, wherein 1≤o≤k, o is an integer, the $o^{th}$ lithium ion battery set $useN_o$ includes $useS_o$ battery modules, and m=Σ$useS_o$; and
(5) The SOC of the selected battery modules is adjusted to make the maximum SOC and the minimum SOC of the battery modules selected from the battery module set useN meet |MaxSOC−MinSOC|≤ΔS, and then the selected battery modules are connected in series to form a battery pack for use, wherein ΔS=0.05.

When one or more battery modules in the battery module set useN need to be replaced due to damage or decrease of the full-charge capacity after the battery modules are used for a period of time, another battery module is selected form the battery set $newN_k$, then the SOC of the selected battery module is adjusted to fall between MaxSOC and MinSOC of the battery module set useN measured after the to-be-replaced battery module is removed, and then the selected battery module is connected into the battery module set useN for use.

For instance, in embodiment 1, two lithium titanate battery modules in the set useN in embodiment 1 are used, and the other lithium titanate battery module is not used. When one of the lithium titanate battery modules in the set useN is broken, the standby lithium titanate battery module is directly selected from set useN to replace the broken lithium titanate battery module. When the standby lithium titanate battery module is used for replacing the broken lithium titanate battery module, the SOC of the standby battery module is adjusted to fall between MaxSOC and MinSOC of the battery module set useN measured after the broken battery module is removed, and then the standby battery module is connected into the set in series for use.

The invention is expounded above with reference to the embodiments, but these embodiments are only preferred ones and should not be regarded as restrictive to the invention. All equivalent variations and improvements made within the application range of the invention should also fall within the patent scope of the invention.

What is claimed is:

1. A method for combined use of different types of lithium ion batteries, comprising the following steps:
(1) providing a first lithium ion battery set $N=\{N_1, N_2, \ldots, N_i\}$, wherein an $i^{th}$ lithium ion battery set $N_i$ includes first lithium ion battery modules $S_i$, i>1, and i is an integer;
(2) setting a reference capacity C0;
(3) selecting the first lithium ion battery modules having capacity greater than or equal to (C0−ΔC) and smaller than or equal to (C0+ΔC) after being fully charged from the first lithium ion battery set $N_i$ and forming a second lithium ion battery set $newN=\{newN_1, newN_2, \ldots, newN_k\}$, wherein 0.001≤ΔC/C0≤0.1, 1≤k≤i, and k is an integer;
(4) selecting second lithium ion battery modules m from the second lithium ion battery set $newN_k$ and constituting a third lithium ion battery set $useN=\{useN_1, useN_2, \ldots, useN_o\}$ according to types of third lithium ion battery modules, wherein 1≤o≤k, o is an integer, $o^{th}$ third lithium ion battery set $useN_o$ includes the third lithium ion battery modules $useS_o$, and m=Σ$useS_o$; and
(5) adjusting the SOC of the third lithium ion battery modules, making the maximum SOC and the minimum SOC of the third lithium ion battery modules selected from the third lithium ion battery set useN meet |MaxSOC−MinSOC|≤ΔS, and then connecting the third lithium ion battery modules in series to form a battery pack for use, wherein 0.001≤ΔS≤0.1.

2. The method according to claim 1, wherein when one or more third lithium ion battery modules in the third lithium ion battery set useN need to be replaced due to damage or decrease of a full-charge capacity after being used for a period of time, selecting another third lithium ion battery module from the third lithium ion battery set useN, then adjusting the SOC of the selected third lithium ion battery module to fall between MaxSOC and MinSOC of the third lithium ion battery set useN measured after the to-be-replaced battery module is removed, and then the selected third lithium ion battery module is connected into the third lithium ion battery set useN for use.

3. The method according to claim 1, wherein the different types of lithium ion batteries are selected from two or more of lithium iron phosphate batteries, lithium titanate batteries, ternary lithium batteries, lithium manganate batteries and lithium cobalt oxide batteries.

4. The method according to claim 1, wherein ΔC/C0=0.05, and ΔS=0.05.

5. The method according to claim 1, wherein each said battery module in the third lithium ion battery set useN is managed through a battery management module $M_j$, wherein 1≤j≤m, and j is an integer; and the whole series battery pack is managed through a battery pack management module, and the battery management modules $M_j$ are electrically connected with the battery pack management module via a communication unit.

6. The method according to claim 5, wherein the battery management module $M_j$ comprises an acquisition module, a balance module, a control module and a communication unit, and the acquisition module, the balance module and the communication unit are connected with the control module.

7. The method according to claim 6, wherein the battery pack management module comprises a pack acquisition module, a general control module and a communication module, and the general control module is connected with the pack acquisition module, the communication module and the battery management modules.

8. The method according to claim 1, wherein the communication unit is a CAN bus.

* * * * *